(12) United States Patent
Touve et al.

(10) Patent No.: US 7,917,944 B2
(45) Date of Patent: Mar. 29, 2011

(54) SECURE AUTHENTICATION ADVERTISEMENT PROTOCOL

(75) Inventors: Jeremy W. Touve, Newhall, CA (US); Eric Tolliver, Moorpark, CA (US)

(73) Assignee: Alcatel Lucent, Paris (FR)

( * ) Notice: Subject to any disclaimer, the term of this patent is extended or adjusted under 35 U.S.C. 154(b) by 1252 days.

(21) Appl. No.: 11/011,876

(22) Filed: Dec. 13, 2004

(65) Prior Publication Data

US 2006/0130126 A1    Jun. 15, 2006

(51) Int. Cl.
*H04K 1/00*  (2006.01)
(52) U.S. Cl. .......................................... 726/5
(58) Field of Classification Search .............. 726/1, 4–5, 726/21, 23, 8, 9; 709/224–225; 713/168, 713/170, 172
See application file for complete search history.

(56) References Cited

U.S. PATENT DOCUMENTS

| | | | | |
|---|---|---|---|---|
| 5,950,195 | A * | 9/1999 | Stockwell et al. | 707/4 |
| 6,286,104 | B1 * | 9/2001 | Buhle et al. | 726/4 |
| 6,856,800 | B1 * | 2/2005 | Henry et al. | 455/411 |
| 6,986,161 | B2 * | 1/2006 | Billhartz | 726/23 |
| 2002/0032855 | A1 * | 3/2002 | Neves et al. | 713/154 |
| 2004/0068668 | A1 | 4/2004 | Lor et al. | |
| 2006/0143699 | A1 * | 6/2006 | Nagata et al. | 726/11 |

FOREIGN PATENT DOCUMENTS

| EP | 1414262 A1 | 4/2004 |
|---|---|---|
| EP | 1439667 A2 | 7/2004 |

OTHER PUBLICATIONS

Ala-Laurila, Juha et al, Wireless LAN Access Network Architecture for Mobile Operators, IEEE Communications Magazine, Nov. 2001 p. 82-89 , XP-001107810.
Haverinen, Henry, et al, "Cellular Access Control and Charging for Mobile Operator Wireless Local Area Networks", IEEE Wireless Communications, Dec. 2002, p. 52-60, XP-001143468.

* cited by examiner

Primary Examiner — Beemnet W Dada
(74) Attorney, Agent, or Firm — Wall & Tong, LLP

(57) ABSTRACT

A network device for distributing authentication information between authorized nodes for purposes of concurrently "pre-authenticating" a mobile user at a plurality of points throughout a LAN is disclosed. When a client attempts to access the network through the network device, the network device attempts to authenticate the client based on the credentials presented by the user. If authenticated, the client is admitted into the network at the network device and the client's pre-authentication information transmitted to one or more network nodes associated with an authentication group. Upon receipt of the pre-authentication information, the one or more network nodes are authorized to admit the client into the network at those nodes in addition to the network device at which the client was initially authenticated, thereby concurrently pre-authorizing the client at multiple points across the network.

21 Claims, 5 Drawing Sheets

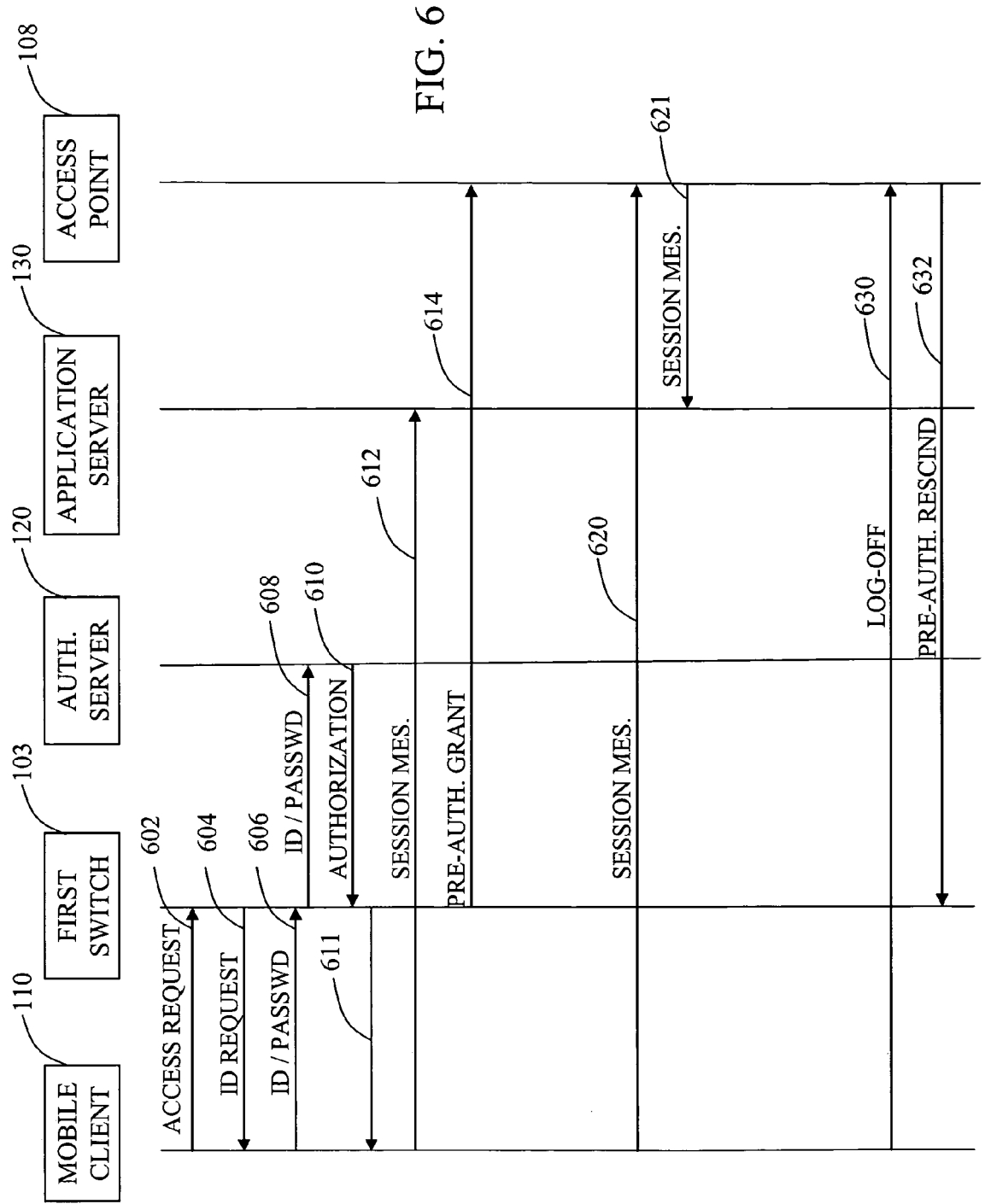

SECURE AUTHENTICATION ADVERTISEMENT PROTOCOL

FIELD OF INVENTION

The present invention relates to a technique for securely sharing authentication information between network nodes to facilitate user access. In particular, the invention relates to a system and method for automatically sharing client authentication information between switching devices and access points to permit the client to roam through the network without being re-authenticated at each network node.

BACKGROUND

Network with multiple edge devices or access points typically require that all clients be authenticated using a central authentication server. The authentication server thus becomes a bottleneck in the network through which all authenticated traffic must flow. Moreover, when a client moves from one access point or edge device to another, the client must be re-authenticated by the authentication server to establish connectivity to the core network again. The process of being re-authenticated consumes time, disrupts client connectivity, may result in loss of data, and is unnecessary where the client is merely moving between secure nodes in a private network, for example.

There is therefore a need for a system and method for securely distributing authentication information of a client between participating edge devices or access points, reduce the need to access the authentication server, and reduce time and effort to repeatedly re-authenticate clients that move within a network between different edge devices and or access points.

SUMMARY

The invention features a network device for distributing authentication information between authorized nodes for purposes of concurrently "pre-authenticating" a mobile user, for example, at a plurality of points throughout a local area network (LAN) or other network domain. The preferred embodiment is a network device for advertising security authentication in a network comprising one or more network nodes associated with an authentication group, an authentication server, and a client having an associated client identifier and credentials. The network device preferably comprises at least one port adapted to receive a packet and credentials from the client; a table for retaining the client identifier of one or more authenticated clients; and an authentication manager. The authentication manager is adapted to determine whether the client has been pre-authenticated by querying the table using information from the packet, e.g. the source MAC address; determine whether to authenticate the client from the authentication server based on the client credentials if not pre-authenticated; and transmit the client identifier to the one or more network nodes if the client is authenticated by the authentication server. Upon receipt of the client identifier, the one or more network nodes are authorized to admit the client to the network at those nodes, thereby concurrently pre-authorizing the client at multiple points across the network. The client credentials presented in the initial packet transmitted by the client generally comprises the client's user identifier and password. The network device may be selected from the group comprising a router, a bridge, a multi-layer switch, a network access point, a wireless network access point, and a combination thereof.

BRIEF DESCRIPTION OF THE DRAWINGS

The present invention is illustrated by way of example and not limitation in the figures of the accompanying drawings, and in which:

FIG. 6 is a message diagram produced within the network as a client is initially authenticated and then pre-authenticated within the network, in accordance with the preferred embodiment.

DETAILED DESCRIPTION

Figure 1:
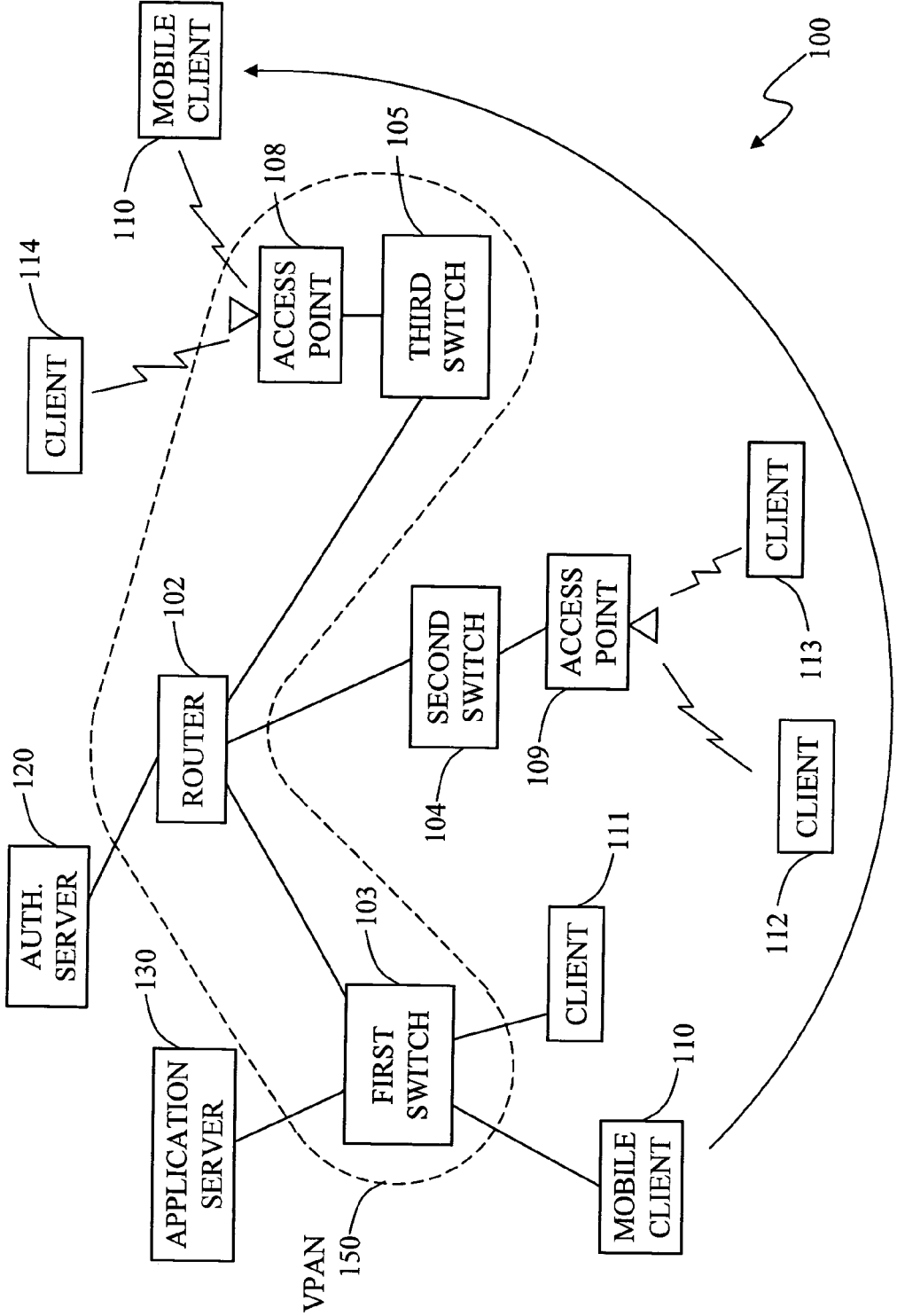
FIG. 1 is a data communications network including a plurality of network devices adapted to exchange pre-authentication information, in accordance with the preferred embodiment.

Illustrated in FIG. 1 is a data communications network including a plurality of network devices adapted to exchange pre-authentication information. The network 100 in the preferred embodiment may include or operatively couple to a local area network (LAN), a wide area network (WAN), a metropolitan area network (MAN), an Internet Protocol (IP) network, the Internet, or a combination thereof, for example. The network 100 includes a plurality of switching devices 102-105, a plurality of clients 110-114, an application server 130, and an authentication server 120. Any of the switching devices 102-105 may include or be operatively coupled to a wireless access point such as access points 108-109. Similarly, one or more of the clients 110-114 may include wired or wireless capability permitting the device to migrate through the network 100, as mobile client 110 migrates from the first switching device 110 to the access point 108.

The first switching device 103 and third switching device 105 of the preferred embodiment are enabled with Ethernet and Internet Protocol (IP) protocol, although various other network layer protocols-including Connectionless Network Protocol (CLNP) or Internetwork Packet eXchange (IPX)/Sequenced Packet Exchange (SPX)—and link layer protocols—including token ring and asynchronous transfer mode (ATM) WAN/serial protocols such as T1/E1—may be implemented.

As described in more detail below, the switching devices of the network 100 may be associated with one or more virtual pre-authentication networks (VPANs) authentication groups, each of which is designated by a unique VPAN identifier. The first VPAN 110, for example, includes the first switching device 103, the router 102, the third switching device 105, as well as the wireless access point 108.

Figure 2:
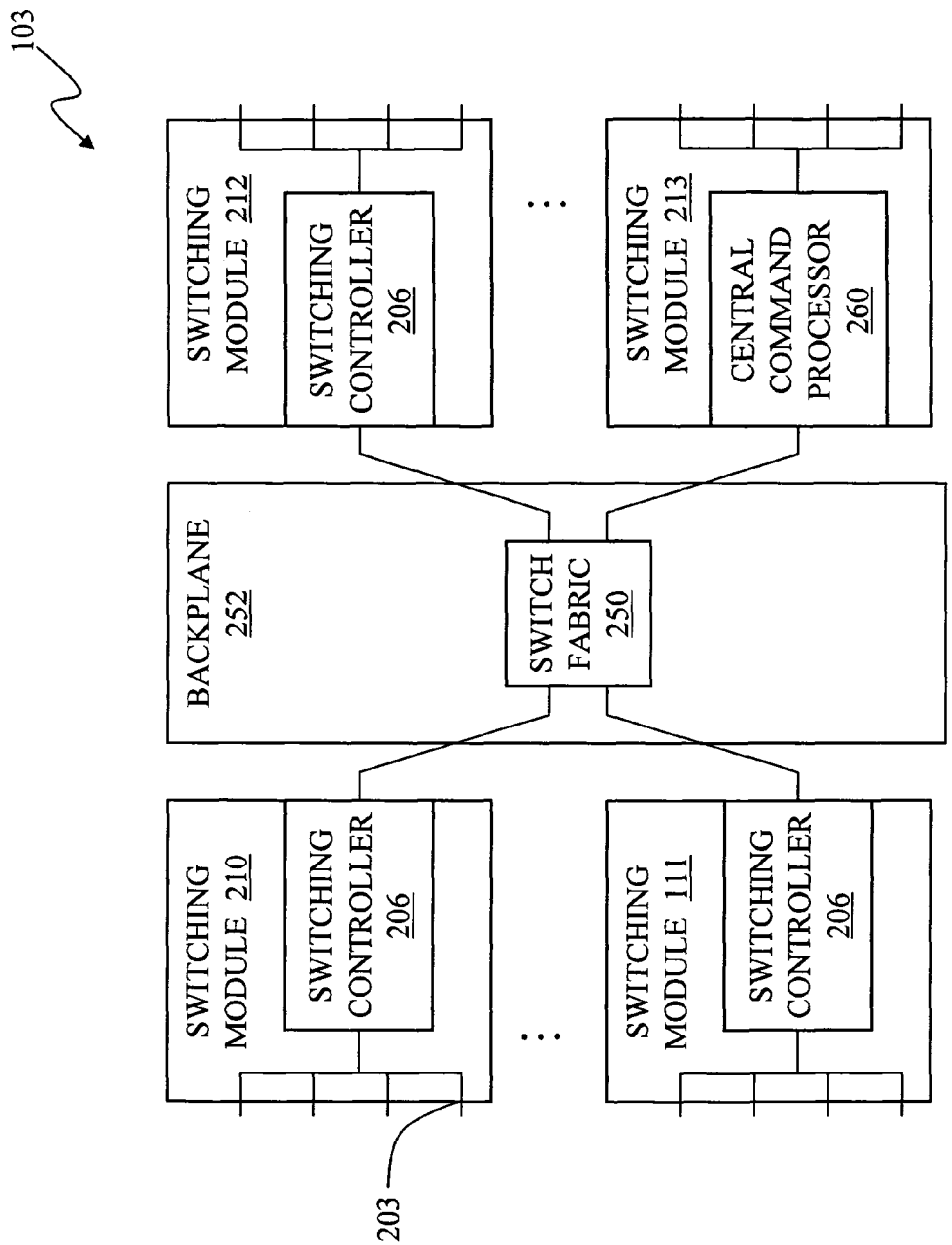
FIG. 2 is a functional block diagram of a multi-layer switching device for performing secure authentication advertisement, in accordance with the preferred embodiment.

Illustrated in FIG. 2 is a functional block diagram of a multi-layer switching device for performing secure authentication advertisement. The switching device 103 preferably comprises a plurality of switching modules 210 operatively coupled to one another by means of a switch fabric 250 for transmitting protocol data units (PDUs) between switching modules. A switching module 210 may take the form of a switch processor, switching element, or switching blade adapted to detachably engage a slot or bus system (not shown) in the backplane 252 that operatively couples each of the switching modules 210 together.

Each of the plurality of switching modules 210 comprises a plurality of external ports 203 operatively coupled to the network 100 via a network communications link. Each switching module 210 in the preferred embodiment further includes at least one switching controller 206 generally capable of, but not limited to, Layer 2 (Data Link) switching and Layer 3 (Network) routing operations as defined in the Open Systems Interconnection (OSI) reference model. As such, each of the modules 210 is adapted to transmit protocol data units (PDUs) to and receive PDUs from the network via ports 203, and to transmit PDUs to and receive PDUs from every other switching module by means of the switch fabric 250.

For purposes of this application, PDUs flowing into a switching module 210 from a communications link toward the switch fabric 250 are referred to herein as ingress PDUs, and the switching module 210 through which the ingress PDUs enters the switching device 103 is generally referred to as an ingress switching module. PDUs flowing from the switching fabric 250 to a communications link are referred to herein as egress PDUs, and the switching module from which they are transmitted is referred to as an egress switching module. Each of the plurality of switching modules 210 of the present embodiment may serve as both an ingress switching module and an egress switching module depending on the flow and its direction. The switching device 103 is one of a plurality of network nodes that may be adapted to perform secure authentication advertisement including routers, bridges, traffic classifiers, rate policers, accounting devices, editing devices, and address look-up devices.

Figure 3:
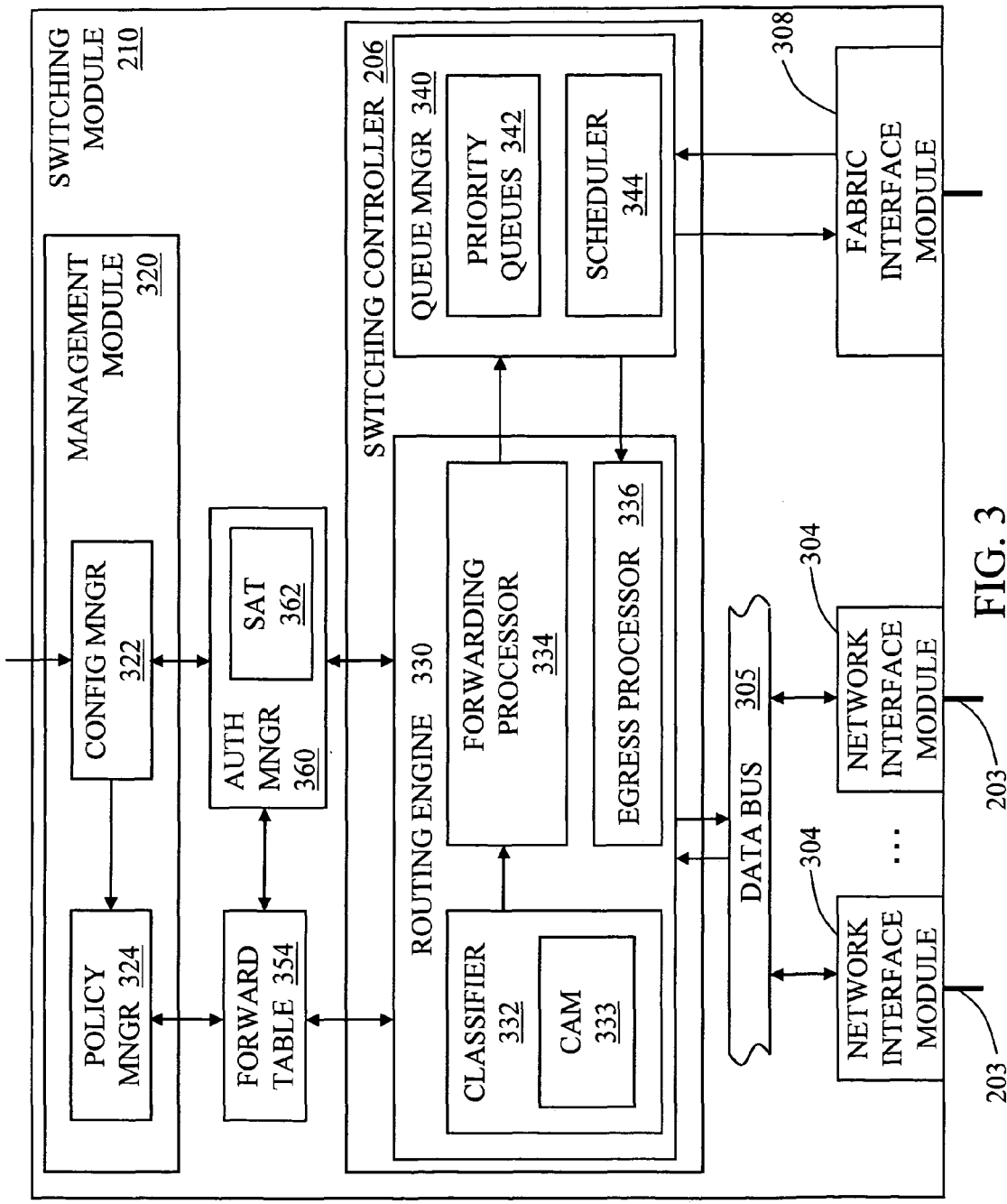
FIG. 3 is a functional block diagram of a switching module for performing secure authentication advertisement, in accordance with the preferred embodiment.

Illustrated in FIG. 3 is a functional block diagram of a switching module for performing secure authentication advertisement. The switching module 210 preferably comprises a plurality of network interface modules (NIMs) 304, at least one switching controller 206, a management module 320, and a fabric interface module 308. Each of the NIMs 304 is operatively coupled to one or more external ports 203 for purposes of receiving and transmitting data traffic. The NIMs 304, preferably enabled with Institute of Electrical and Electronics Engineers (IEEE) 802.3, IEEE 802.2 and or IEEE 802.11 for example, are adapted to perform physical layer and data link layer control that operably couple the switching device 103 to communication media including wired, wireless, and optical communications links.

Ingress PDUs received by NIMs 304 are transmitted via an internal data bus 305 to the switching controller 206 where a routing engine 330 generally makes filtering and forwarding decisions before the PDUs are buffered in a queue manager 340 en route to the destination node. The routing engine 330 of the preferred embodiment comprises a classifier 332, a forwarding processor 334, and an egress processor 336. The classifier 332 extracts one or more fields of the ingress PDUs, queries a content addressable memory (CAM) 333 using one or more properties associated with the ingress PDU including the extracted fields, and classifies the PDUs into one of a plurality of flows. The PDU properties generally include, for example, the destination and source addresses, ingress port number, protocol type, priority information, and virtual local area network (VLAN) information including 802.1Q tags.

The switching controller 206 in the preferred embodiment also employs an authentication manager 360 to perform admission testing prior to executing the applicable forwarding operations identified by classifier 332. If the ingress PDU originated from an authenticated client that is currently logged into the switching device 103, for example, the client identity and associated access privileges are recorded in a shared admission table (SAT) 362 retained internal to the switching device 103. If the client has not been authenticated or is not currently logged in, the client is prompted to provide credentials, preferably a user name and password, for determining the client's access profile from an external database such as authentication server 120. If the access privilege sought by the client is denied by the switching device's SAT 362 or the authentication server 120, the ingress PDU is filtered.

If the access sought by the client is granted by the SAT 362 or the authentication server 120, however, the classifier 332 retrieves the associated PDU forwarding instructions from the forwarding table 354 and transmits the instant PDU to the forwarding processor 334. Subsequent PDUs originating from the same client are also admitted to the switching device 103 as long as the client is logged in or the session between the client and destination node maintained.

When a client entering the network 100 is authenticated by the authentication server 120, the authentication manager 360 is adapted to update the SAT 362 with an associated client identifier (ID). In accordance with the preferred embodiment of the present invention, the authentication manager 360 is further adapted to transmit a pre-authentication status message to one or more network nodes associated with the same VPAN authentication group as the switching device 103. The pre-authentication status message in the preferred embodiment comprises the client identifier of the newly-authenticated client and its associated access privileges. Upon receipt of a pre-authentication status message, the recipients update their respective shared admission tables with the client identifier and the access privileges of the newly-authenticated client. In this manner, a client is effectively logged into each of the members of the VPAN security group once the client affirmatively logs into one member of the security group.

Once the client is authenticated at the node to which it is transmitting, the ingress PDU is transmitted to the forwarding processor 334 where the forwarding operations identified by the retrieved forwarding instructions are executed. If the destination media access control (MAC) address is known to and reachable through the switching device 103, the PDU is generally switched to the appropriate egress port without alteration. If unknown, the source MAC address may be associated with the ingress port 203 by a source learning mechanism and the PDU broadcast to every other egress port within the VLAN associated with the ingress port. If the destination node of the PDU is within another network, the forwarding processor 334 generally decrements the time to live (TTL) counter and re-encapsulated the packet with a new data link layer header, for example, before routing the packet to the appropriate destination.

The forwarding processor 334 in some embodiments is also adapted to perform packet processing operations including, but are not limited to, header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, and coloring marking used for policing and traffic shaping, for example.

After packet processing by the routing engine 330, PDUs destined for nodes reachable through other switching modules of switching device 103 are temporarily buffered by the queue manager 340 within the priority queues 342 in accordance with their Class of Service (CoS) and or Quality of Service (QoS) requirements until the bandwidth is available to transmit the PDUs through the switching fabric 250. The PDUs are then transmitted via the fabric interface module 308 to the appropriate egress switching module for transmission in the direction of the PDU's destination node.

In the preferred embodiment, the fabric interface module 308 is adapted to both transmit ingress PDUs to the switching fabric 250 as well as receive egress PDUs from each of the other one or more switching modules. In the preferred embodiment, the egress data received from the fabric interface module 308 are buffered in priority queues 342, passed through the routing engine's egress processor 336 for statistical processing, for example, and transmitted from the appropriate egress port via one of the NIMs 304.

Figures 4, 5:
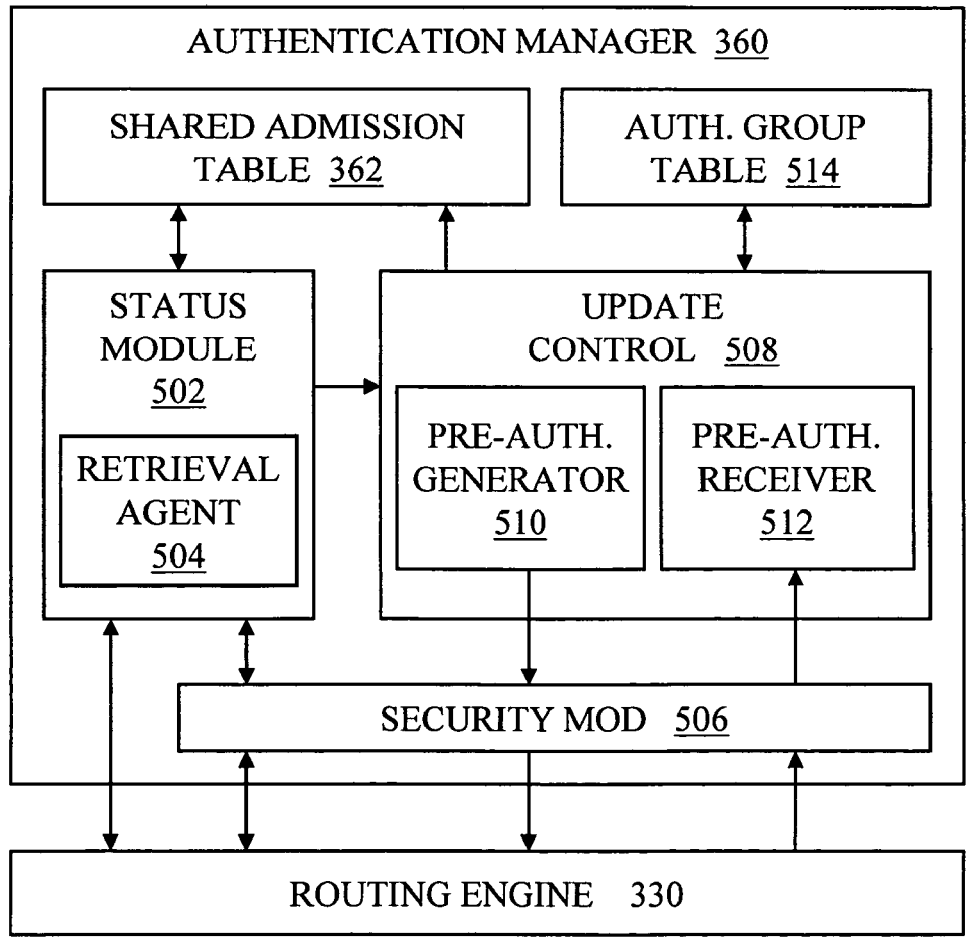
FIG. 4 is a schematic of a shared admission table for preauthorizing clients within a network, in accordance with the preferred embodiment.
FIG. 5 is a functional block diagram of an authentication manager for pre-authorizing clients within a network, in accordance with the preferred embodiment.

Illustrated in FIG. 4 is a schematic of a shared admission table 362 for preauthorizing clients within a network. The SAT 400 comprises one or more fields that are used to identify an authenticated client and the associated access privileges of the client. In the preferred embodiment, an authenticated client is identified by its address, preferably the MAC source address (SA) 401, although the address may also be an IP source address for example. The access privileges associated with the client preferably include one or more VLAN identifiers (VIDs) 402, although the access privileges may also include one or a plurality of access controls specifying the right of the user to view, download, or change various files.

The client identifiers recited in the SAT 362 include those clients that directly logged into the network node hosting the SAT 362, e.g., switch 103, as well as the clients that directly logged into other network nodes associated with the same VPAN authentication group. As explained in more detail below, the client IDs of clients that directly logged into other network nodes in the VPAN are learned in one or more authentication status messages generated by the authorization manager 360 of those other network nodes. The SAT 362 is embodied in the authentication manager 360 in the preferred embodiment, although it may also be integrated with the bridging and routing information of the forwarding table 354 or in the central command processor 260. The client may be a node within or external to the network 100 or an application running thereon, for example.

Illustrated in FIG. 5 is a function block diagram of an authentication manager 360 for pre-authorizing clients within a virtual pre-authentication area network. The authentication manager 360 of the preferred embodiment includes an authentication status module 502, security module 506, a SAT 362, a pre-authentication message generator 510, and a pre-authentication message receiver 512. Upon receipt of a PDU from a client seeking to connect to the switching device 103 or a node reachable through the device 103, the routing engine 330 determines whether the client is authenticated to do so. In particular, the routing engine 330 transmits one or more fields extracted from the ingress PDU to the status module 502, which is adapted to first query the shared admission table 362 to determine the admission status of the client.

If the status manager 502 cannot authenticate the client based in the SAT 362, the status manager 502 notifies the routing engine 330 that the client is provisionally denied authentication, causing the routing engine 330 to prompt the client for credentials, preferably a user identifier and password. Upon receipt of the user identifier and password, the status manager 502, i.e., and more particularly the retrieval agents 504, generates an authentication query transmitted to an external database, e.g., the authentication server 120, to determine the admission status of the client. In the preferred embodiment, the authentication query and the subsequent response are encrypted and decrypted, respectively, by the security module 506.

If the authentication server 120 issues a response granting the authentication, the status module 502 triggers the update control 508 to add the client identifier to the internal SAT 362. The pre-authentication generator 510 in the preferred embodiment then determines the destination addresses of the each of the other members of the authentication group table (AGT) 514 to which the first switching device 103 belongs. The pre-authentication generator 510 then sends a pre-authentication grant message encrypted by the security module 506 to each member of VPAN authentication group. Similarly, the pre-authentication generator 510 also transmits a pre-authentication rescind message to each member of the authentication group when the clients logs-off or authentication otherwise revoked.

The update control 508 is also adapted to receive pre-authentication grant and rescind messages from other members of the authentication group. Upon receipt of pre-authentication grant message, the update control 508, particularly the pre-authentication receiver 512, causes the client identifier and associated access privileges therein to be added to the local SAT 362. Similarly, the pre-authentication receiver 512 causes a client identifier and privileges to be removed from the local SAT 362 upon receipt of a pre-authentication direction to rescind privileges, that is, a rescind message from another member of the authentication group.

In this manner, a client is able to quickly gain access to each and every member of an authentication group without the formality of a user log-in procedure. Although the authentication manager 360 in the preferred embodiment is configured to provisionally deny authentication to each client not explicitly listed in the SAT 362, one skilled in the art will appreciate that the authentication manager 360 may be configured with different default authentication rules.

Illustrated in FIG. 6 is a message diagram produced within the network as a client is initially authenticated and then pre-authenticated within the network. The first message transmitted by the mobile client 110, for example, to a node within a VPAN is referred to herein as an access request message 602. Upon receipt of the access request message 602, the first switching device 103 queries its SAT 362 using the MAC source address of the mobile node 110. If the source address is not present and the mobile client 110 provisionally denied authentication, the switching device 103 transmits an identifier request message 604 prompting the client 110 to enter a user ID and password 606. If the authentication server 120 is able to authenticate the client 103 based on the received user ID and password 606, the server 412 transmits an authentication message 610-611 including the authentication confirmation. Upon receipt of the authentication confirmation, the first switching device 103 permits the mobile client 110 to transmit to and establish a communications session 612 with the requested resource such as application server 130.

In accordance with the preferred embodiment, the first switching device 103 also transmits a pre-authentication grant message 614 to each member of the VPAN authorization group 150, including the router 102 which forwards the grant message 614 to the third switching device 105 which forwards it to the access point 108. Each of the nodes in the VPAN 150 that receives the grant message updates its SAT 362 with the mobile user's client ID to signify that the mobile client 110 is logged in at that node.

At a later time, if and when the mobile client 110 migrates within the VPAN 150 as illustrated in FIG. 1, the mobile client 110 can continue the ongoing session with the application server 130 in real-time without disruption. As the mobile client 110 swaps the connection to the first switching device 103 with the wireless connection to the access point 108, for example, the mobile client 110 continues to transmit session messages 620-621 to and receive messages from the application server 130 as part of the pre-existing session 612. As described above, the access point 108 authenticates the mobile user based on the MAC source address and VLAN association information extracted from the session messages 620 without prompting the mobile client 110 again for a user ID and password, which would disrupt the ongoing session with the application server 130 and result in the loss of data and inconvenience to the user.

Note that a network node consistent with the preferred embodiment is assigned at least one of a plurality of VPAN authentication group identifiers by the network administrator. In this manner, a network may be segmented into multiple virtual pre-authentication subnets. For example, a corporate network may be subdivided into separate, and to some degree overlapping, subnets for an engineering department, a financial department, and a sales department. A client that is authenticated in one portion of the network may then be required to log in at a different portion of the network if the node to which access is sought has a different VPAN authentication association than that portion of the network to which the client is currently authenticated. Referring to FIG. 1 as an example, the mobile client 110 would need to log in to connect to either the second switching device 104 or its associated access point 109 because the client's pre-authenticated is valid only among the first switching device 103, router 102, third switching device 105, and access point 108.

At a later time, if and when the mobile client 110 logs off the node to which it is connected, the node revokes the pre-authentication at the connected node and at each of the other nodes associated with the VPAN authentication group. If the mobile client 110 logs off 630 from the access point 108, for example, the access point 108 generates a pre-authentication rescind message 632 transmitted to each of the other members of the VPAN 150 including the third switching device 105 which forwards the rescind message 632 to the router 102 which forwards it to the first switching device 103. Upon receipt of the rescind message 632, each of the nodes removes the mobile client ID from its SAT, thereby preventing the mobile client 110 from accessing the network 100 without logging in once again.

In the preferred embodiment, the network nodes associated with a particular VPAN, i.e., the members of a VPAN authentication group, are adapted to discover one another using a neighbor discovery protocol known to those skilled in the art. The neighbor discover protocol is preferably a Layer 2 protocol that employs "hello" messages transmitted to a reserved multicast MAC address to enable each network device to advertise its own identity, preferably an IP address, to other nodes in the LAN, discover the identities of its neighbors, determine which of the neighbors are running the same pre-authentication protocol of the present invention, and which of the one or more VPANs the neighbors support or which of the one or more VPANs are supported by nodes reachable through those neighbors. In the preferred embodiment, each device wanting to share authentication is provided an encryption key that is unique for the VPAN and the key used to open an encrypted communication stream between the network nodes over which the client identification information can be shared. An example neighbor discovery protocol with which the present invention may utilize is IEEE 802.1A/B, hereby incorporated by reference.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A network device for advertising security authentication in a network comprising one or more network nodes associated with an authentication group, an authentication server, and a client having an associated client identifier and credentials, the network device comprising:
   at least one port adapted to receive, from the client, a protocol data unit (PDU) and the credentials associated with the client;
   a table adapted to retain a client identifier of each of one or more authenticated clients;
   and an authentication manager adapted to:
      determine whether the client is authenticated based on the PDU, wherein determining whether the client is authenticated based on the PDU comprises querying the table using information from the PDU,
      if the client cannot be authenticated based on the PDU, transmit an authentication request toward the authentication server based on the client credentials, and
      if the client is authenticated by the authentication server, transmit the client identifier toward the one or more network nodes.

2. The network device of claim 1, wherein the authentication manager is adapted to determine whether the client is authenticated based on a source address of the PDU.

3. The network device of claim 1, where the client credentials comprises a user identifier and password.

4. The network device of claim 1, wherein the network device is selected from the group consisting of:
   router, bridge, multi-layer switch, network access point, wireless network access point, and a combination thereof.

5. The network device of claim 1, wherein the client is only prompted for the client credentials if the client cannot be authenticated based on the PDU.

6. The network device of claim 1, wherein authentication manager is further adapted to cause the client identifier of the client to be added to the table in response to determining that the client has been authenticated by the authentication server.

7. The network device of claim 1, wherein the network device belongs to the authentication group;
   wherein the one or more authenticated clients, for which respective one or more client identifiers are maintained in the table, comprises clients that logged into the network device and clients that logged into the one or more network nodes associated with the authentication group.

8. A method for advertising security authentication in a network comprising one or more network nodes associated with an authentication group, an authentication server, and a client having an associated client identifier and credentials, the method comprising:
   receiving, from the client, a protocol data unit (PDU) and the credentials associated with the client;

determining whether the client is authenticated based on the PDU, wherein determining whether the client is authenticated based on the PDU is performed using a table adapted to retain a client identifier of each of one or more authenticated clients, wherein determining whether the client is authenticated based on the PDU comprises querying the table using information from the PDU;

when the client cannot be authenticated based on the PDU, transmitting an authentication request toward the authentication server based on the client credentials, and when the client is authenticated by the authentication server, transmitting the client identifier toward the one or more network nodes.

9. The method of claim 8, wherein the determination as to whether the client is authenticated is based on a source address of the PDU.

10. The method of claim 8, where the client credentials comprises a user identifier and password.

11. The method of claim 8, wherein the method is performed by one of the network nodes, wherein the one of the network nodes comprises at least one of a router, a bridge, a multi-layer switch, a network access point, and a wireless network access point.

12. The method of claim 8, wherein the client credentials are received in response to a request for client credentials that is initiated when a determination is made that the client cannot be authenticated based on the PDU.

13. The method of claim 8, wherein the client identifier of the client is added to the table in response to a determination that the client has been authenticated by the authentication server.

14. The method of claim 8, wherein the method is performed by one of the network nodes;
wherein the one or more authenticated clients, for which respective one or more client identifiers are maintained in the table, comprises clients that logged into the one or more network nodes associated with the authentication group.

15. A non-transitory computer-readable storage medium storing instructions which, when executed by a processor, cause the processor to perform a method for advertising security authentication in a network comprising one or more network nodes associated with an authentication group, an authentication server, and a client having an associated client identifier and credentials, the method comprising:

receiving, from the client, a protocol data unit (PDU) and the credentials associated with the client;

determining whether the client is authenticated based on the PDU, wherein determining whether the client is authenticated based on the PDU is performed using a table adapted to retain a client identifier of each of one or more authenticated clients, wherein determining whether the client is authenticated based on the PDU comprises querying the table using information from the PDU;

when the client cannot be authenticated based on the PDU, transmitting an authentication request toward the authentication server based on the client credentials, and when the client is authenticated by the authentication server, transmitting the client identifier toward the one or more network nodes.

16. The non-transitory computer-readable storage medium of claim 15, wherein the determination as to whether the client is authenticated is based on a source address of the PDU.

17. The non-transitory computer-readable storage medium of claim 15, where the client credentials comprises a user identifier and password.

18. The non-transitory computer-readable storage medium of claim 15, wherein the method is performed by one of the network nodes, wherein the one of the network nodes comprises at least one of a router, a bridge, a multi-layer switch, a network access point, and a wireless network access point.

19. The non-transitory computer-readable storage medium of claim 15, wherein the client credentials are received in response to a request for client credentials that is initiated when a determination is made that the client cannot be authenticated based on the PDU.

20. The non-transitory computer-readable storage medium of claim 15, wherein the client identifier of the client is added to the table in response to a determination that the client has been authenticated by the authentication server.

21. The non-transitory computer-readable storage medium of claim 15, wherein the method is performed by one of the network nodes;
wherein the one or more authenticated clients, for which respective one or more client identifiers are maintained in the table, comprises clients that logged into the one or more network nodes associated with the authentication group.

* * * * *